(12) United States Patent
Yotsuya et al.

(10) Patent No.: US 6,335,843 B2
(45) Date of Patent: *Jan. 1, 2002

(54) RECORDING MEDIUM DRIVING DEVICE

(75) Inventors: Michio Yotsuya; Hironobu Ohuchi; Kazushige Kawazoe, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,339

(22) Filed: May 19, 1998

(30) Foreign Application Priority Data

May 23, 1997 (JP) .......................................... P09-134035
May 23, 1997 (JP) .......................................... P09-134036

(51) Int. Cl.[7] ............................................. G11B 19/04
(52) U.S. Cl. ........................ 360/60; 360/97.02; 360/128
(58) Field of Search ................................ 360/128, 137, 360/60, 97.02, 97.03, 97.04, 69, 74.1

(56) References Cited

U.S. PATENT DOCUMENTS

| 5,341,262 A | * | 8/1994 | Yamasaki et al. | ............ | 360/128 |
| 5,342,500 A | * | 8/1994 | Inanaga et al. | ............. | 204/421 |
| 5,463,506 A | * | 10/1995 | Mitsuyasu et al. | ....... | 360/77.17 |
| 5,726,622 A | * | 3/1998 | Furuyama et al. | ............ | 338/35 |

FOREIGN PATENT DOCUMENTS

| JP | 01-133244 | * | 5/1989 | |
| JP | 2-121014 | | 5/1990 | ............. G06F/1/00 |
| JP | 05-182441 | * | 7/1993 | |

* cited by examiner

*Primary Examiner*—Andrew L. Sniezek
(74) *Attorney, Agent, or Firm*—Oblon, Spivak, McClelland, Maier & Neustadt, P.C.

(57) ABSTRACT

Described herein is a hard disk drive HDD which adopts a CSS type floating or levitation head device. A condensation sensor is provided on the inner surface of a housing or chassis. Since the capacity of the chassis is large and moisture adsorbed by the chassis due to dew condensation or the like is hard to dry, the condensation or the like produced on the inner surface side of the chassis can be detected accurately by placing the condensation sensor on the inner surface of the chassis. The condensation sensor may be attached to an arm or suspension constituting an actuator, a head slider, a flexible printed board, or a portion or the like formed of the same material as that for a magnetic disc. When the condensation or the like is detected by the condensation sensor, the magnetic disc is allowed to stand by in a state of remaining stopped rotating until it is not detected. Thus, damage to the magnetic disc and breakage of the head slider or the like due to their sticking can be previously prevented from occurring. Owing to the above construction, high humidity or condensation can be effectively detected and damage to a recording medium and breakage of the head slider or the like can be prevented satisfactorily.

1 Claim, 14 Drawing Sheets

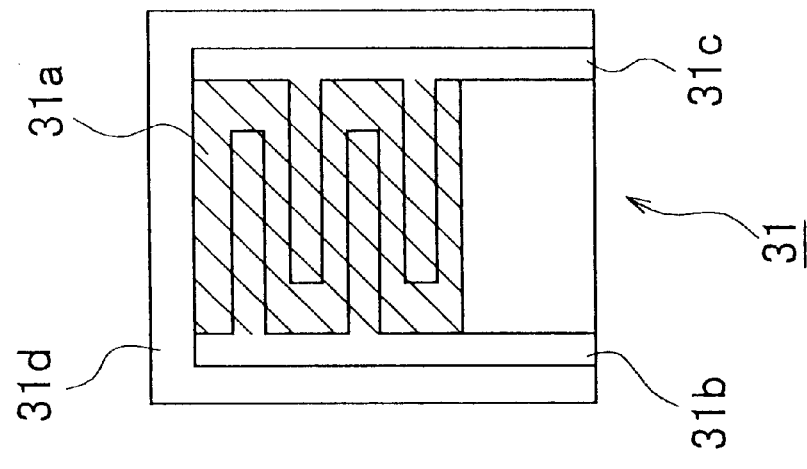
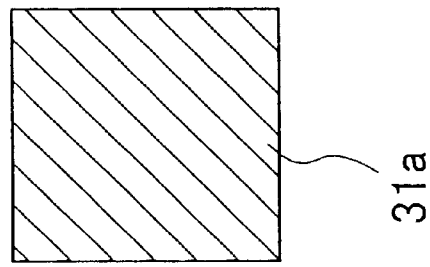
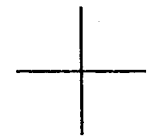
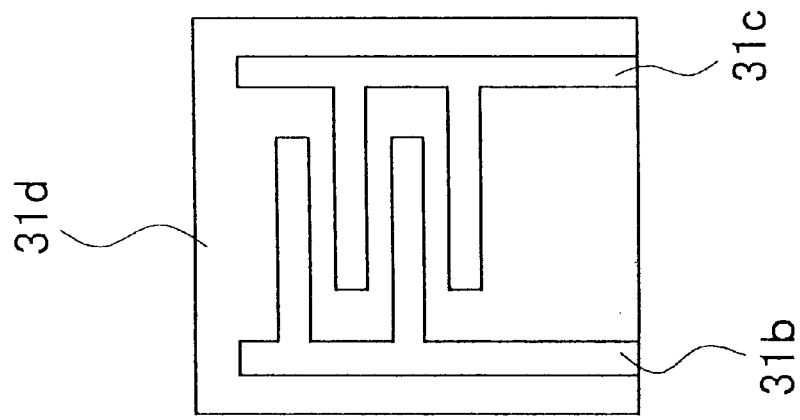
FIG. 4

F I G. 1 1
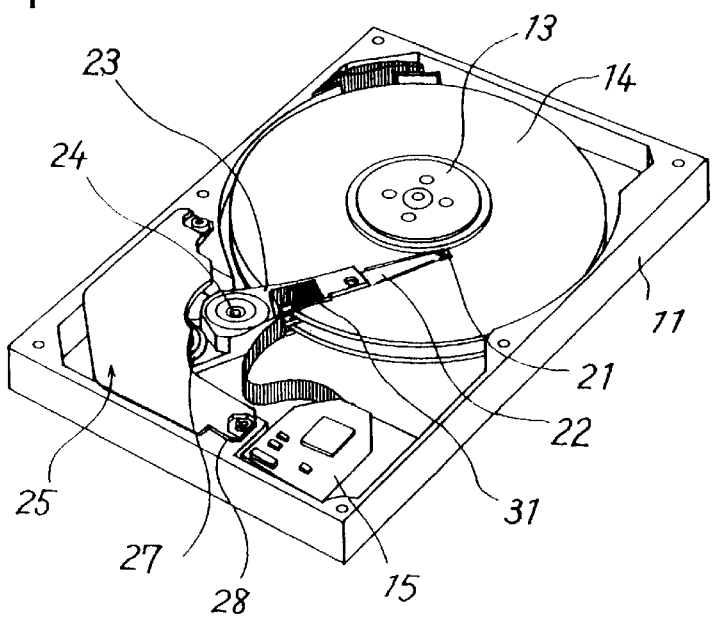
F I G. 1 2
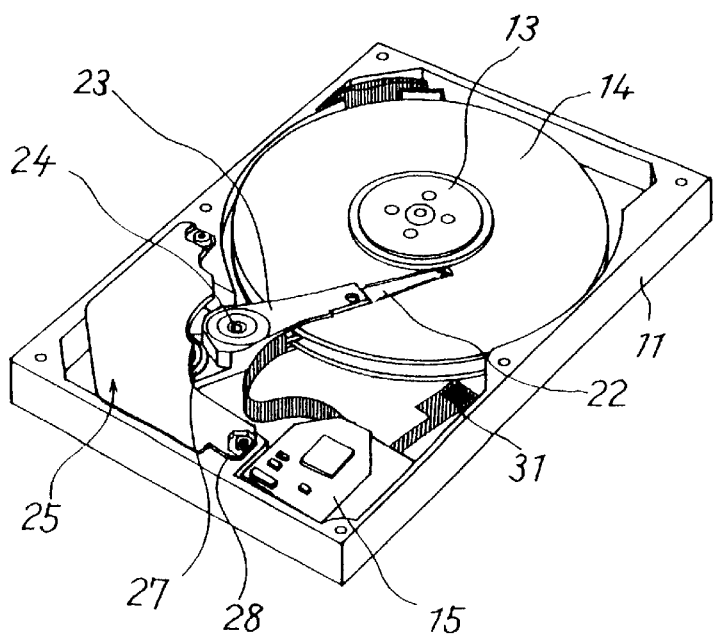

RECORDING MEDIUM DRIVING DEVICE

BACKGROUND OF THE INVENTION

1. Field of the Invention

This invention relates to a disc driving device suitable for use in a hard disk drive or the like incorporated into a personal computer or connected to the outside.

2. Description of the Related Art

As a hard disk drive, a floating or levitation head-type hard disk drive has heretofore been known wherein in order to avoid wear and damage that occur due to a contact between the surface (corresponding to an information recording and reproducing surface) of a magnetic disc and a magnetic head, the magnetic head is formed integrally with a floating or levitation slider having an air lubrication surface and the magnetic head records information on the magnetic disc and reproduces it therefrom in a state of being in non-contact with the magnetic disc. According to this type of hard disk drive, spacing losses can be reduced following some extent of irregularities of the magnetic disc and the wear and damage can be prevented from occurring.

Meanwhile, a head slider is at a stop in the innermost peripheral portion called "shipping zone" in a state of being in contact with the magnetic disc when the power is off in a common hard disk drive. With the power-on, the magnetic disc starts to rotate and the head slider starts to take off the magnetic disc under wind pressure from the magnetic disc. If the power is reversely turned off, then the head slider is shifted to the shipping zone and thereafter lands on the magnetic disc quietly. This system is called "CSS (Contact Start Stop) system" because the head slider is landed on and taken off the magnetic disc in contact with the magnetic disc.

When flat surfaces are brought into contact with each other, sticking is generally easy to occur therebetween through a water or moisture content. In practice, the hard disc drive has attributed importance to the problem that the sticking occurs between the magnetic disc and the head slider due to high humidity or dew condensation. Even if one attempts to start the rotation of the magnetic disc in a stuck state, the magnetic disc is not rotated at all. At worst, the head slider or suspension might be peeled off or separated from an arm, for example. Thus, there is a possibility that the hard disk drive will not be used. The degree of this sticking increases as the size of a micro contact area called "true or real contact area" increases. Therefore, the sticking is often avoided by roughly processing the surface of the magnetic disc on purpose.

However, a reduction in spacing defined between the magnetic disc and the magnetic head is very effective at implementing record densification. The spacing is expected to be reduced from now on. When the surface of the magnetic disc is roughly processed as described above in this case, the amount of floating or levitation of the magnetic head that runs in a levitated state, cannot be reduced, thereby causing a hindrance to the record densification.

It is thus considered that only the shipping zone is roughly processed. According to this, however, a problem arises that the number of man-hours needed to perform its processing increases and the levitation of the head slider becomes unstable in transition regions of the roughly-processed shipping zone and other smooth zones.

Incidentally, an NCSS (Non Contact Start Stop) system wherein even if the power is off, a head slider is brought into non-contact with a magnetic disc, has been proposed in addition to the aforementioned CSS system. This type of NCSS system generally adopts a method of placing a so-called slide called "lamp" in the vicinity of the outer periphery of the magnetic disc and withdrawing or retracting the head slider onto the lamp while the magnetic disc stops rotating.

According to the NCSS system, since the head slider is constructed so as not to contact the magnetic disc, a friction-wear problem can be avoided and a problem associated with sticking produced due to high humidity or condensation can be avoided. However, there arises a problem related to corrosion or the like that if the head slider is placed on the surface of the magnetic disc where moisture has adhered to the surface of the magnetic disc due to the high humidity or condensation, then the moisture adsorbed by the magnetic disc adheres to the magnetic head. This is similar even in the case of the CSS system even if not described above.

SUMMARY OF THE INVENTION

With the foregoing in view, it is therefore an object of the present invention to provide a recording medium driving device capable of previously preventing accidents such as head breakage produced due to high humidity or condensation, etc.

According to one aspect of this invention, for achieving the above object, there is provided a recording medium driving device for recording a signal on a recording medium or reproducing the signal from the recording medium, comprising:

a condensation sensor; and means for controlling the operation of a device body based on the output of the condensation sensor;

wherein the condensation sensor is provided inside a device housing.

The condensation sensor is preferably attached to a member highest in specific heat, which is located inside the device body.

The part highest in specific heat may preferably be a part which constitutes the device body, or a mounting member made of the same material as that for the part.

The recording medium driving device further includes a part which slides over the recording medium. In the recording medium driving device, the condensation sensor is preferably attached to the part sliding on the recording medium or a mounting member formed of the same material as that for the part.

Preferably, the recording medium is a disk-shaped recording medium, a head slider provided with a head for recording a signal on the disk-shaped recording medium or reproducing the signal from the disk-shaped recording medium is further provided and the condensation sensor is attached to the head slider or a mounting member comprised of the same material as that for the head slider.

According to another aspect of this invention, for achieving the above object, there is provided a recording medium driving device comprising:

a head slider provided with a head for recording a signal on a disk-shaped recording medium or reproducing the signal from the disk-shaped recording medium;

an actuator for moving the head slider in a radial direction of the disk-shaped recording medium;

a condensation sensor; and means for controlling the operation of a device body based on the output of the condensation sensor;

wherein the condensation sensor is mounted to the actuator.

The condensation sensor is preferably attached to an arm or a suspension which constitutes the actuator.

According to a further aspect of this invention, for achieving the above object, there is provided a recording medium driving device comprising:

a head slider provided with a head for recording a signal on a disk-shaped recording medium or reproducing the signal from the disk-shaped recording medium;

an actuator for moving the head slider in a radial direction of the disk-shaped recording medium;

a flexible printed board including a circuit for processing a signal recorded and reproduced by the head and controlling the operation of the actuator;

a condensation sensor; and means for controlling the operation of a device body based on the output of the condensation sensor;

wherein the condensation sensor is mounted to the flexible printed board.

According to a still further aspect of this invention, for achieving the above object, there is provided a recording medium driving device for recording a signal on a disk-shaped recording medium or reproducing the signal from the disk-shaped recording medium, comprising:

a condensation sensor; and means for controlling the operation of a device body based on the output of the condensation sensor;

wherein the condensation sensor is attached to a portion located in the vicinity of the disk-shaped recording medium and having the flow of air developed by the rotation thereof.

According to a still further aspect of this invention, for achieving the above object, there is provided a disk driving device comprising:

means for rotating and driving a disk-shaped recording medium;

an actuator for moving a head slider provided with a head for recording a signal on the disk-shaped recording medium or reproducing the signal from the disk-shaped recording medium in a radial direction of the disk-shaped recording medium;

a condensation sensor placed in a device body;

a detector circuit for detecting high humidity or condensation based on the output of the condensation sensor; and means for controlling the operation of the device body according to an output detected by the detector circuit.

Preferably, when the high humidity or condensation is detected by the detector circuit, the control means controls the operation of the actuator so that the head slider is withdrawn from above the surface of the disk-shaped recording medium.

Preferably, when the high humidity or condensation is detected by the detector circuit, the control means controls the rotating and driving means so that the disk-shaped recording medium is rotated during some or all of a period in which the high humidity or condensation is being detected by the detector circuit.

Preferably, the head is a contact start-stop type, and when the high humidity or condensation is detected by the detector circuit in a state in which the disk-shaped recording medium is being rotated, the control means controls the rotating and driving means so that the disk-shaped recording medium is rotated during some or all of the period in which the high humidity or condensation is being detected by the detector circuit.

Preferably, when the high humidity or condensation is detected by the detector circuit in a state in which the signal is being recorded on or reproduced from the disk-shaped recording medium, the control means stops the recording or reproducing operation.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a diagram showing an example of a configuration of a condensation sensor;

FIG. 11 is a diagram depicting an example in which a condensation sensor is attached to an arm of a rotatable actuator;

FIG. 12 is a diagram showing an example in which a condensation sensor is provided in the neighborhood of a magnetic disc;

DETAILED DESCRIPTION OF THE PREFERRED EMBODIMENTS

Figure 1:
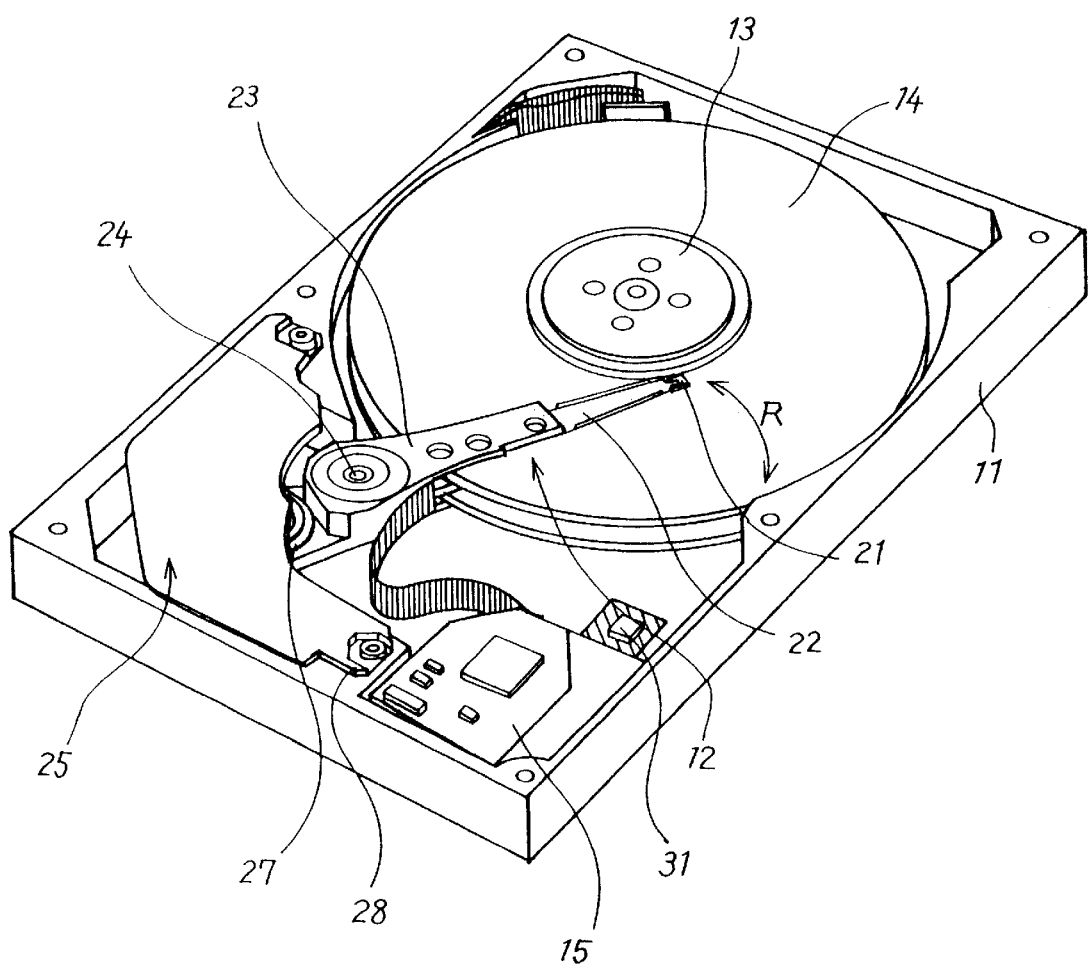
FIG. 1 is a perspective view schematically showing a configuration of a hard disk drive according to one embodiment of the present invention.

Preferred embodiments of the present invention will hereinafter be described with reference to the accompanying drawings. FIG. 1 schematically shows a configuration of a hard disk drive (HDD) 10 according to one embodiment of the present invention. The hard disk drive 10 adopts a CSS-type levitation or floating head device. Further, the hard disk drive 10 includes a rotatable actuator 12 and a spindle motor 13 both provided on a chassis or housing 11, a magnetic disc 14 attached to the spindle motor 13, and a flexible printed board 15 disposed on the housing 11 and having electric circuits and lead patterns formed thereon by a semiconductor process and printing or the like.

The housing 11 is formed by, e.g., an aluminum alloy or the like in a substantially flat form. The spindle motor 13 is provided on a flat portion thereof. The spindle motor 13 is constructed as a flat brushless motor and is driven and controlled so as to obtain a constant angular velocity, whereby the magnetic disc 14 is rotated.

The actuator 12 comprises a head slider (floating or levitation slider) 21 equipped with a magnetic head (not shown), a suspension 22 used as an elastic support member for supporting the head slider 21 thereon, an arm 23 for supporting the suspension 22 thereon, a vertical shaft 24 for rotatably supporting one end of the arm 23, and a voice coil motor 25 for turning the arm 23 about the vertical shaft 24.

Now, the head slider 21 and the suspension 22 supports, as head support members, the magnetic head attached to the head slider 21 so as to be movable in a radial direction R of the magnetic disc 14. In this case, a load is applied to the head slider 21 on the magnetic disc 14 side by the suspension 22.

Figure 2A:
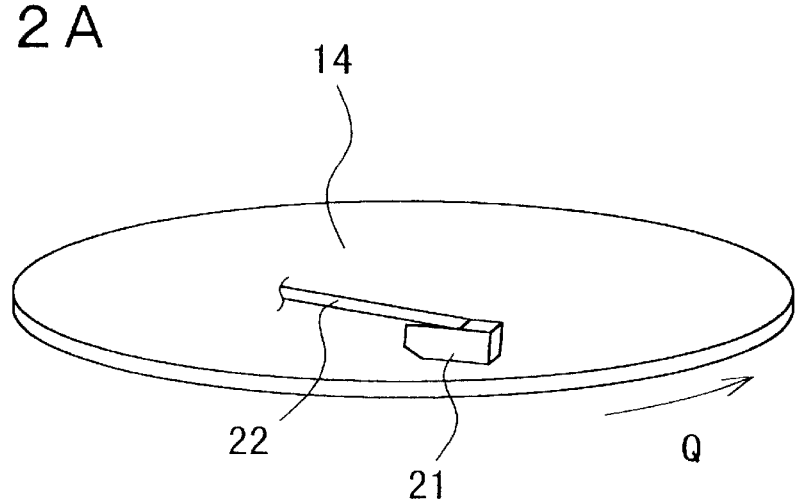
FIGS. 2A and 2B are respectively diagrams for describing a head slider (floating slider)
Figure 2B:
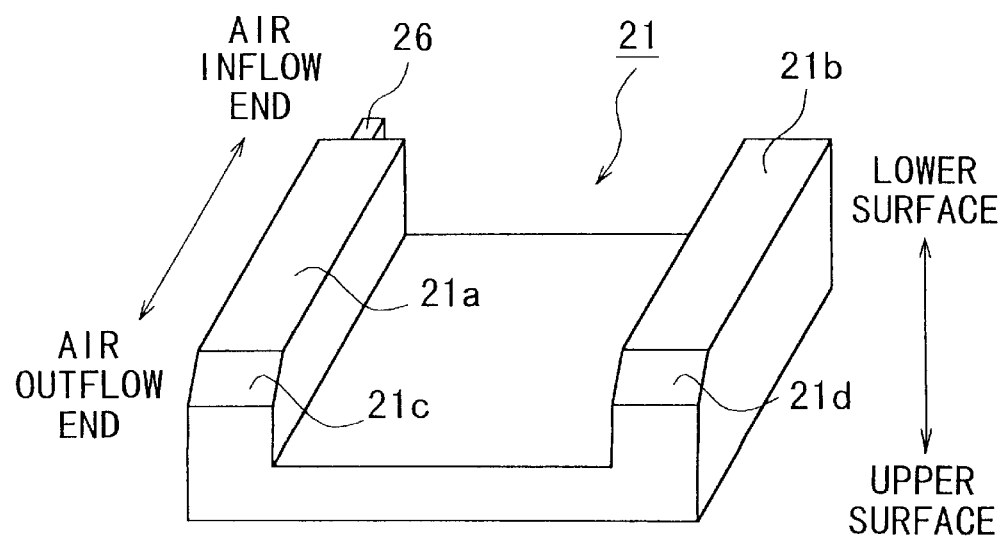

As shown in FIG. 2B, the head slider 21 is formed as a rectangular parallelepiped flat in its entirety and has rails 21a and 21b provided on both sides of its lower surface, which act as air bearing surfaces. Inclined portions 21c and 21d having slow gradients are provided on the air-inflow end sides of the rails 21a and 21b. Further, a magnetic head 26 is attached to an end surface of the rail 21a on its air-outflow end side.

Figure 3:
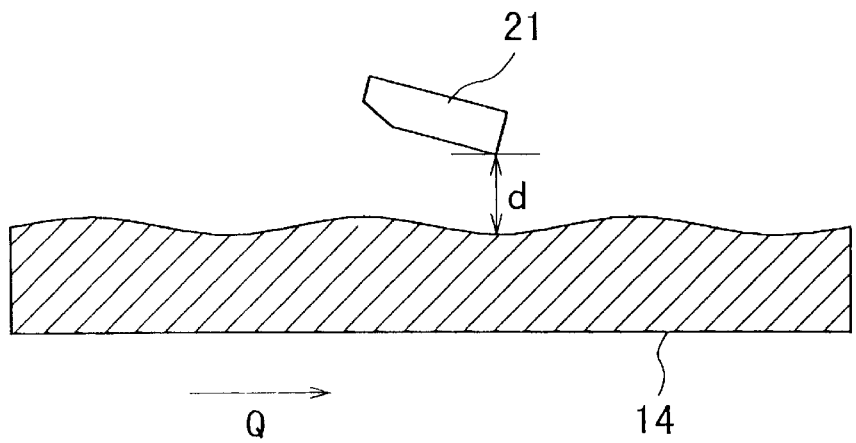
FIG. 3 is a diagram for describing the levitation running of the head slider.

When the head slider 21 having the above-described construction is supported by the suspension 22 and approaches the surface of the magnetic disc 14 as shown in FIG. 2A, the head slider 21 experiences or undergoes a levitation or floating force by the flow of air introduced between the rails 21a and 21b of the head slider 21 and the surface of the magnetic disc 14 as the magnetic disc 14 rotates (where the direction of rotation thereof is indicated by arrow Q in the drawing). Owing to the levitation force, the magnetic head 26 floats or levitates and runs together with the head slider 21 with a small interval or space (corresponding to the amount of levitation) d as seen from the surface of the magnetic disc 14 (see FIG. 3).

Further, the arm 23 is formed of a material having rigidity and is turned about the vertical shaft 24 so as to move the head slider 21 in the radial direction R of the magnetic disc 14, thereby performing a seek operation. As a result, the magnetic head 26 (see FIG. 2B) attached to the head slider 21 can obtain access to a desired track on the magnetic disc 14. The voice coil motor 25 comprises a voice coil 27 attached to the other end of the arm 23 and a magnet 28 fixed to and placed in the housing 11. In this case, the voice coil 27 is supplied with a drive signal from the outside so that the arm 23 turns about the vertical shaft 24.

In the above-described construction, the magnetic disc 14 is rotated and driven at a constant angular velocity by the spindle motor 13. In this condition, the arm 23 is turned about the vertical shaft 24 and the head slider 21 is shifted in the radial direction R of the magnetic disc 14, whereby the magnetic head 26 attached to the head slider 21 is positioned to a desired track on the magnetic disc 14. As a result, the magnetic head 26 is capable of recording a signal on the desired track of the magnetic disc 14 and reproducing it therefrom.

Figure 5A:
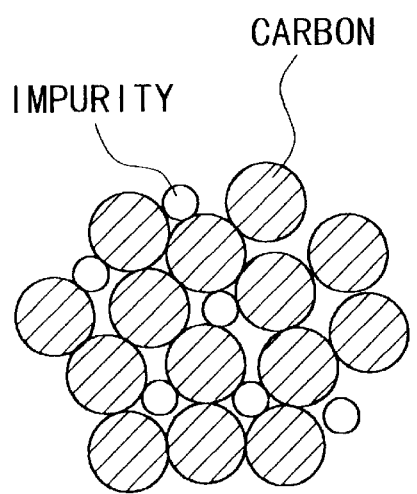
FIGS. 5A and 5B are respectively diagrams illustrating an example of a configuration of a membranous or filmy portion.
Figure 5B:
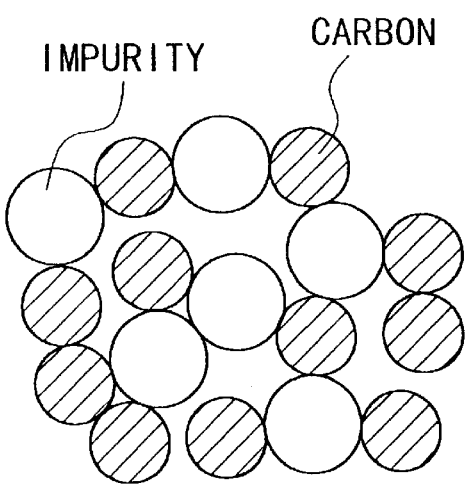

In the present embodiment, a condensation sensor 31 is provided on an inner surface of the housing 11. As shown in FIG. 4, the condensation sensor 31 comprises a membranous or filmy portion 31a, a pair of electrodes 31b and 31c, and an insulative portion 31d. Comb-toothed portions of the pair of electrodes 31b and 31c shaped in comb form are alternately formed on the upper surface of the insulative portion 31d. The membranous portion 31a is provided so as to cover the pair of electrodes 31b and 31c. As shown in FIG. 5A, the membranous portion 31a is made of a material whose electrical resistance varies due to the adhesion of a water or moisture content, such as conductive carbon containing impurities. In the conductive carbon containing the impurities, each impurity thereof expands due to the adhesion of moisture thereto and the electrical resistance thereof increases as shown in FIG. 5B.

Ends of the pair of electrodes 31a and 31b of the condensation sensor 31 are respectively electrically connected to a condensation detector circuit to be described later through conductors or the like. The condensation detector circuit detects high humidity or dew condensation by utilizing an increase in the electrical resistance of the membranous portion 31a of the condensation sensor 31 under the environment of the high humidity or dew condensation.

Incidentally, there may be cases where the flexible printed board 15 is coated with a moisture-proof insulating material such as an acrylic resin, an urethane resin, a fluorine-contained resin, a silicon resin or the like over the entire surface of the board so that it can withstand the environment of the dew condensation. Thus, the flexible printed board 15 can avoid its malfunction developed due to current leakage or the like even under the environment of the dew condensation.

A description will next be made of a circuit configuration or the like of the hard disk drive 10 with reference to FIG. 6.

The hard disk drive 10 has a spindle motor 13 for rotating a magnetic disc 14 and a motor driver 41 for driving the spindle motor 13. The operation of the motor driver 41 is controlled by an MPU (Micro Processing Unit) 61 that constitutes a system controller to be described later.

Figure 7:
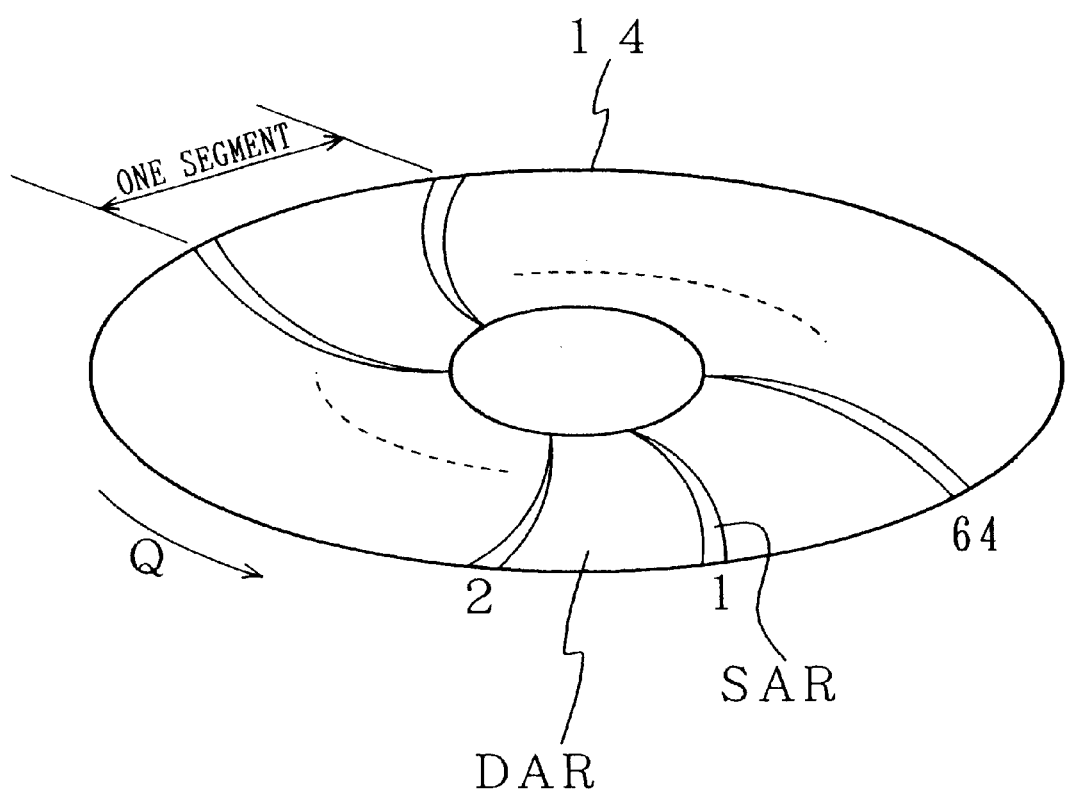
FIG. 7 is a diagram showing a schematic configuration of a magnetic disc.

A schematic configuration of the magnetic disc 14 will now be explained with reference to FIG. 7. Servo areas SAR and data areas DAR are alternately provided within the magnetic disc 14 in the direction of rotation thereof. Namely, a track is uniformly divided into a plurality of segments (frames) (64 segments in the drawing) in the direction of rotation of the magnetic disc 14. The servo areas SAR for recording servo information thereon are provided at the heads of the respective segments and the data areas DAR for recording data thereon are placed following the servo areas SAR. The servo areas SAR respectively draw circular arcs other than straight lines over the range from the inner periphery of the magnetic disc 14 to the outer periphery thereof in association with the skew angle of the magnetic head 26.

Servo information is recorded on each servo area SAR in advance. The servo information consists of a clock mark for obtaining a clock signal synchronized with the rotation of magnetic disc 14, a pattern for obtaining track address information, a pattern for obtaining tracking information of the magnetic head, etc.

Items of data are respectively recorded on the data areas DAR in units of 512 bytes or the like called "sectors". A sector ID (Sector Identification Code), an ECC (Error Correction Code), etc. are added to the data corresponding to each sector and the so-added data is recorded on its corresponding data area DAR. Each sector ID has information or the like indicative of inability to be used due to defects or the like as well as having a head number, a track number, a sector number, etc.

Referring back to FIG. 6, the driver 10 has an inductive head 26A for writing data into each data area DAR of the magnetic disc 14 and a magneto-resistive (MR: Magneto-Resistive) head 26B for reading data from each data area DAR of the magnetic disc 14 and reading servo information from each servo area SAR of the magnetic disc 14, both of which serve as the magnetic head 26. The heads 26A and 26B are formed as a complex type head, for example. As described above, the magnetic head 26 is attached to the head slider 21 (see FIGS. 1 and 2B).

The drive 10 includes an interface 60 for connecting to a host computer, an MPU 61 used as the system controller for controlling the entire operation of the device, and a ROM (Read Only Memory) 62 storing therein operation programs or the like used for the MPU 61. In this case, a write command and a read command transmitted from the host computer are supplied to the MPU 61 through the interface 60.

The drive 10 has a write data buffer 63 for temporarily storing write data WD sent from the host computer through the interface 60, and a write data processing circuit 64 for effecting an error correction code adding process, a digital modulating process, etc. on the write data WD read in write timing from the write data buffer 63 to thereby obtain record data. For example, an MFM (Modified Frequency Modulation) mode or system, an RLL (Run Length Limited) system or the like is used as a digital modulation system.

The drive 10 has a write compensating circuit 65 for providing write compensation for the record data outputted from the data processing circuit 64, and a recording amplifier 66 for producing a recording current signal corresponding to data outputted from the write compensating circuit 65 and supplying it to the inductive head 26A. The write compensating circuit 65 makes a minute correction in on-writing magnetization reversal timing to a peak shift of a read signal resulting from magnetization reversal interference developed upon high-density recording.

The drive 10 has a reproduction amplifier 70 for amplifying a signal $S_{MR}$ reproduced from the magnetic disc 10 by the MR head 26B upon reading, and a read compensating circuit 71 for providing read compensation for a signal outputted from the reproduction amplifier 70. The read compensating circuit 71 reduces a peak shift by a representation of a waveform or the like.

The drive 10 includes a data processing circuit 73 for providing a digital demodulating process, an error correcting process, etc. for a detected pulse outputted from the read compensating circuit 71 to thereby obtain read data RD and a read data buffer 74 for temporarily storing the read data RD outputted from the data processing circuit 73. The data processing circuit 73 also extracts the aforementioned sector ID. The sector ID is supplied to the MPU 61.

The drive 10 has a head position control circuit 80 for controlling the operation of a VCM driver 34 for driving the voice coil motor 25 to thereby position each of the heads 26A and 26B to a target track on the magnetic disc 14, and a servo information detector 81 for detecting servo information from a reproduced signal in the corresponding servo area SAR, which is outputted from the reproduction amplifier 70. Track address information TAD and tracking information TRA obtained from the servo information detector 81 are supplied to the head position control circuit 80. Incidentally, the head position control circuit 80 is supplied with target track address information ADO from the MPU 61 upon writing and reading.

The drive 10 includes a clock generator 82 for generating a clock signal CLK synchronized with the rotation of the magnetic disk 14, and a timing generator 83 for generating timing signals indicative of various information point positions on the magnetic disc 14.

The clock generator 82 extracts a reproduced isolated waveform of a clock mark from a clock gate signal supplied from the servo information detector 81 and generates a clock signal CLK synchronized with the rotation of the magnetic disc 14 based on the extracted waveform. The clock signal CLK produced from the clock generator 82 is supplied to the servo information detector 81 and the timing generator 83 and also supplied to other required points.

The timing generator 83 is supplied with a signal STP indicative of the position of an origin from the servo information detector 81 and the clock signal CLK produced from the clock generator 82 as described above. The timing generator 83 counts the number of clocks from the position of the origin and generates various timing signals on the basis of its counted value.

The drive 10 has the aforementioned condensation sensor 31 and a condensation detector circuit 91 electrically connected to the condensation sensor 31 and for detecting such dew condensation or the like as to deposit moisture on the magnetic disc 14 due to a change in the electric resistance of the condensation sensor 31. An output DEC detected by the condensation detector circuit 91 is supplied to the MPU 61, so that the MPU 61 is able to recognize whether the magnetic disc 14 is placed under the environment of dew condensation or the like.

The operation of the hard disk drive 10 shown in FIG. 6 will be described.

Immediately after power-on or after asynchronization, the following operation for the establishment of initial synchronism is performed. In this case, a signal $S_{MR}$ reproduced from the magnetic disc 14 by the MR head 26B is supplied to and amplified by the reproduction amplifier 70. Further, the clock generator 82 extracts a reproduced isolated waveform of a clock mark from the reproduced signal in the corresponding servo area SAR of the magnetic disc 14 and updates the phase of PLL (Phase-Locked Loop) provided therein on the basis of the extracted waveform to thereby produce a clock signal CLK synchronized with the rotation of the magnetic disc 14.

After the aforementioned establishment of initial synchronism, write/read operations are performed. The write operation will first be explained. When the MPU 61 receives the write command sent from the host computer, it converts a logical block number in the command into a physical position (corresponding to each of a head number, a track number, and a sector number) of the magnetic disc 14 by utilizing a translation table stored in the ROM 62. As a result, the MPU 61 recognizes a target track address and a write start sector.

Further, the MPU 61 supplies target track address information ADO to the head position control circuit 80 to set a target track address (track number), thereby allowing the head position control circuit 80 to start a track seek operation. The track seek operation is done as follows:

The head position control circuit 80 compares track addresses at the present locations of the head 26A and 26B, which are based on the track address information TAD obtained form the servo information detector 81 with target track addresses and controls the VCM driver 34 so that the track addresses at the present places of the head 26A and 26B coincide with the target track addresses respectively. After the track addresses at the present places of the heads 26A and 26B have coincided with the target track addresses respectively, the head position control circuit 80 controls the VCM driver 34 based on the tracking information TRA obtained from the servo information detector 81 so that each of the heads 26A and 26B is positioned to the center of the target track. When each of the heads 26A and 26B is brought to a state of being placed in the center of the target track, the track seek is completed.

After the completion of the track seek, the MPU 61 obtains access to the write start sector by referring to the sector ID extracted by the read data processing circuit 73 and starts the reading of the write data WD transferred from the host computer and temporarily stored in the write data buffer 63. The write data processing circuit 64 effects an error correction code adding process, a digital modulating process, etc. on the write data WD read from the write data buffer 63 to thereby form or create record data. The so-formed record data is subjected to write compensation by the write compensating circuit 65, followed by supply to the recording amplifier 66.

The recording amplifier 66 outputs a recording current signal corresponding to the write data WD therefrom and supplies it to the inductive head 26A. As a result, the write data WD transferred from the host computer is recorded on a predetermined sector of the magnetic disc 14, which has been specified by the write command, by the inductive head 26A.

The read operation will next be explained. When the MPU 61 receives the read command sent from the host computer, it converts a logical block number in the command into a physical position (corresponding to each of a head number, a track number, and a sector number) of the magnetic disc 14 by utilizing a translation table stored in the ROM 62. As a result, the MPU 61 recognizes a target track address and a read start sector.

Further, the MPU 61 supplies target track address information ADO to the head position control circuit 80 to set a target track address (track number), thereby allowing the head position control circuit 80 to start a track seek operation. The track seek operation is performed in a manner similar to the aforementioned write operation.

Upon reading, a signal reproduced from the corresponding data area DAR of the magnetic disc 14 by the MR head 26B is supplied to and amplified by the reproduction amplifier 70. Thereafter, the so-amplified signal is subjected to read compensation by the read compensating circuit 71, followed by supply to the read data processing circuit 73. Further, the read data processing circuit 73 effects a digital demodulating process, an error correcting process, etc. on the signal outputted from the read compensating circuit 71 to thereby obtain read data RD.

After the completion of the track seek, the MPU 61 refers to a sector ID extracted by the read data processing circuit 73 so as to obtain access to the read start sector. After the MPU 61 has obtained access to the read start sector, it transfers the read data RD outputted from the read data processing circuit 73 to the host computer through the read data buffer 74. As a result, the read data RD is obtained from the predetermined sector of the magnetic disc 14, which has been specified by the read command and is transferred to the host computer.

Figure 6:
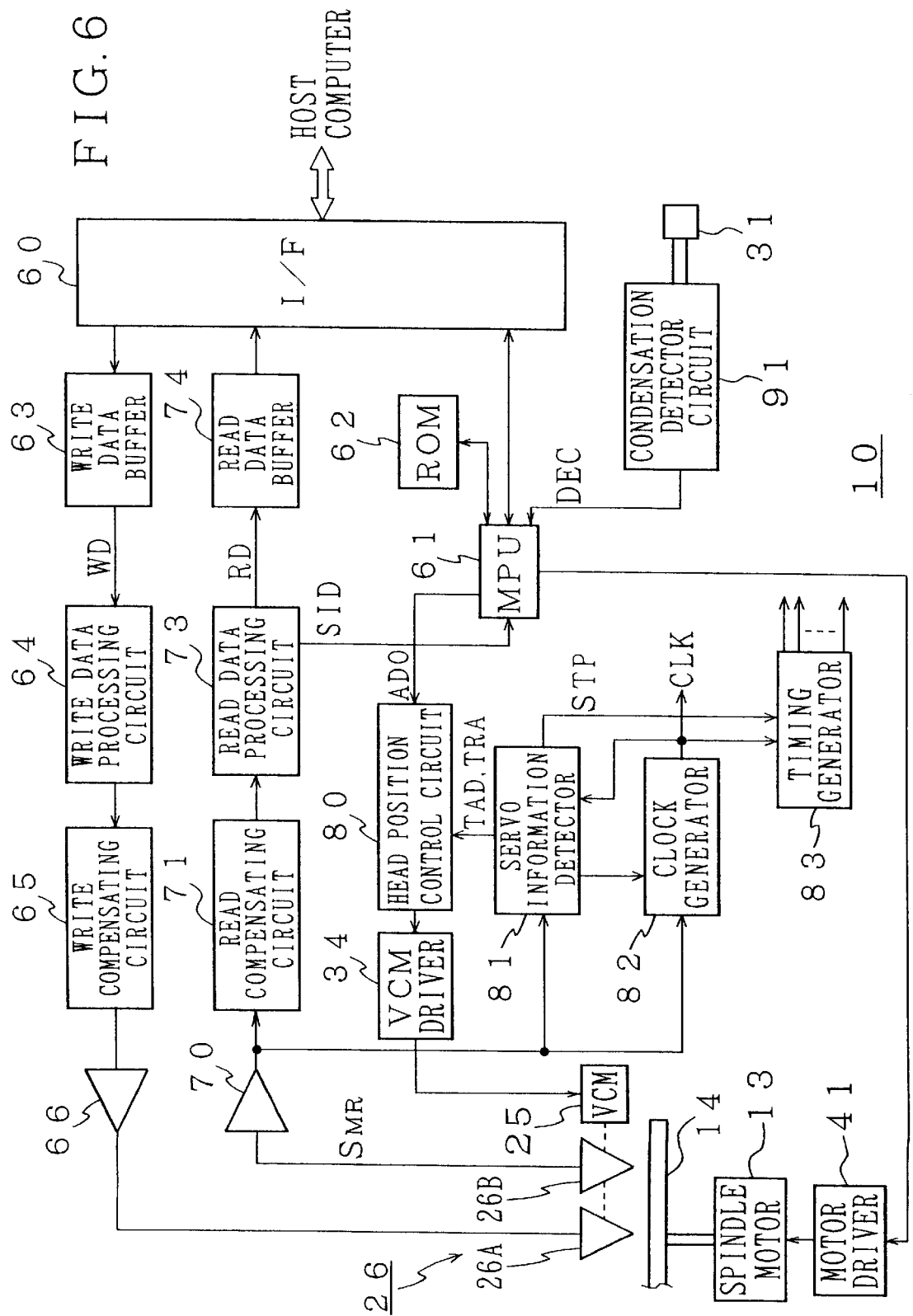
FIG. 6 is a block diagram depicting a circuit configuration of the hard disk drive according to the embodiment of the present invention.
Figure 8:
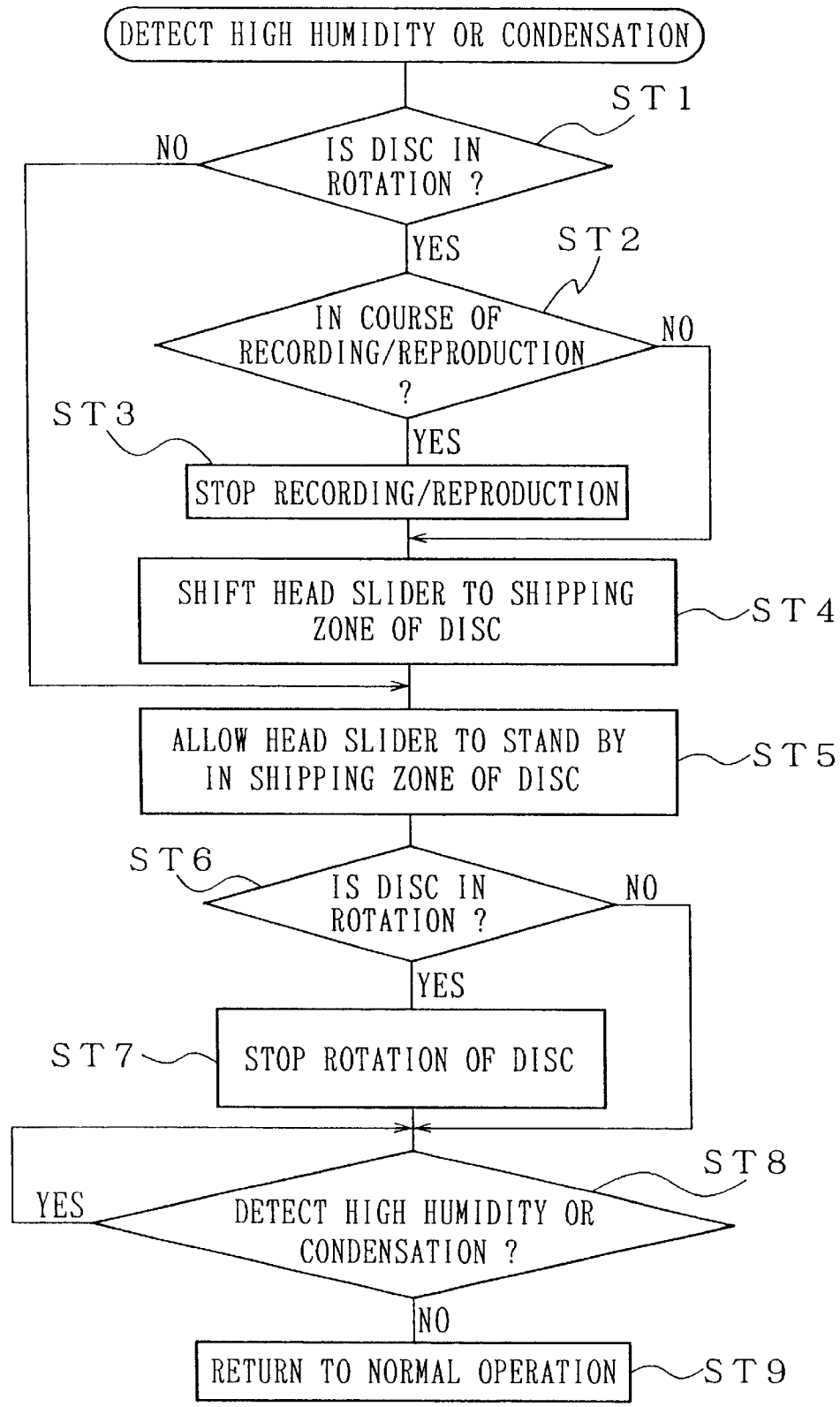
FIG. 8 is a flowchart for describing a control operation of the embodiment at the time that condensation or the like is detected.

When the MPU 61 in the hard disk drive 10 shown in FIG. 6 recognizes the detection of dew condensation or the like from the output DEC detected by the condensation detector circuit 91, it executes a control operation in line with a flowchart shown in FIG. 8.

In Step ST1, the MPU 61 first makes a decision as to whether the magnetic disc 14 is in rotation or being rotated. If the MPU 61 determines that the magnetic disc 14 is in rotation, then it determines in Step ST2 whether the magnetic disc 14 is in course of recording or reproduction. If the MPU 61 determines that the magnetic disc 14 is in course of recording or reproduction, then the MPU 61 stops recording or reproduction in Step ST3 and proceeds to Step ST4. On the other hand, if the MPU 61 determines that the magnetic disc 14 is not in course of recording or reproduction, then, it immediately goes to Step ST4.

In Step ST4, the MPU 61 controls the VCM driver 34 to move the head slider 21 (see FIG. 1) provided with the magnetic head 26 to a shipping zone of the magnetic disc 14 and allow the head slider 21 to stand by in the shipping zone of the magnetic disc 14 in Step ST5. When the answer is found to be NO in Step ST1, then the head slider 21 is already placed within the shipping zone of the magnetic disc 14. Therefore, the MPU 61 immediately proceeds to Step ST5 where the head slider 21 is caused to stand by within the shipping zone of the magnetic disc 14 as it is.

Next, the MPU 61 determines in Step ST6 whether the magnetic disc 14 is in rotation. When it is found that the magnetic disc 14 is being rotated, the MPU 61 controls the motor driver 41 in Step ST7 so as to stop the rotation of the magnetic disc 14. Thereafter, the MPU 61 proceeds to Step ST8. On the other hand, when it is found that the magnetic disc 14 is not in rotation, the MPU 61 immediately proceeds to Step ST8.

The MPU 61 determines in Step ST8 whether the dew condensation or the like is detected by the condensation detector circuit 91. After no condensation or the like has been detected, the MPU 61 goes to Step ST9 where it is returned to its normal or ordinary operation, e.g., a state prior to the detection of the condensation or the like.

In the embodiment described above, the condensation sensor 31 is provided on the inner surface of the housing 11 of the hard disk drive 10. The capacity of the housing 11 is large and the moisture adsorbed by the housing 11 due to the dew condensation or the like is hard to dry. Therefore, the high humidity or dew condensation that occurs on the inner surface side of the housing 11, can be detected accurately by placing the condensation sensor 31 on the inner surface of the housing 11. When the condensation or the like is detected, the magnetic disc 14 remains stopped rotating until it is not detected. It is therefore possible to satisfactorily prevent damage of the magnetic disc 14 and breakage of the head slider 21 or the like from occurring due to sticking developed therebetween.

In the aforementioned embodiment, the condensation sensor 31 is provided on the inner surface of the housing 11. However, the condensation sensor 31 may be placed onto the head slider 21 used as a sliding part. The placement of the condensation sensor 31 in the head slider 21 allows direct detection of dew condensation or the like on the head slider 21 stuck onto the magnetic disc 14 and makes it possible to efficiently prevent damage of the magnetic disc 14 and breakage of the head slider 21 or the like from occurring due to sticking developed between the two.

Figure 9:
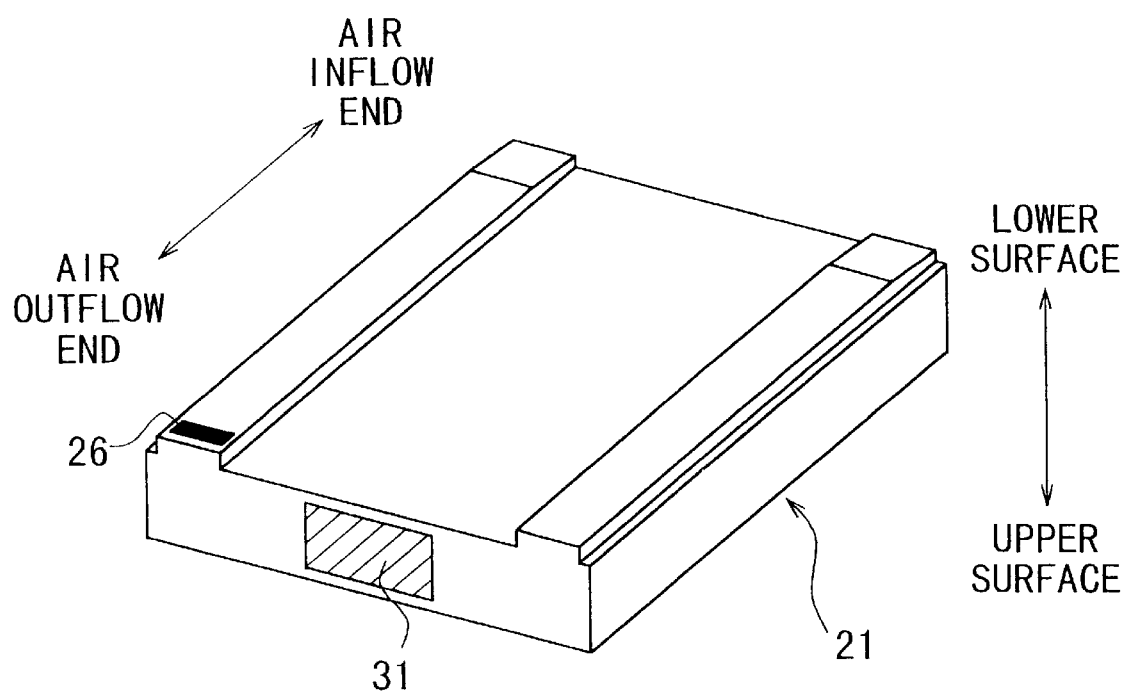
FIG. 9 is a diagram showing an example in which a condensation sensor is attached to the head slider.

It has recently been known that a magnetic head 26 is formed at a rear end of a head slider 21 as shown in FIG. 9 in accordance with a thin-film process. If a step for processing a condensation sensor 31 is also introduced into the thin-film process and the processing of the condensation sensor 31 is performed simultaneously with the processing of the magnetic head 26 in such a case, then the manufacturing cost can be reduced.

Instead of the placement of the condensation sensor 31 in the head slider 21, the condensation sensor 31 may be placed in the same position as that shown in FIG. 1 by way of example under the condition that a mounting member made of the same material as that for the head slider 21 is prepared and the condensation sensor 31 is attached to the mounting member. Thus, even if the condensation sensor 31 cannot be provided due to the fact that any space to provide the condensation sensor 31 does not exist in the head slide 21, the same result as when the condensation sensor 31 has been placed in the head slider 21, can be obtained.

In the aforementioned embodiment, the condensation sensor 31 is provided on the inner surface of the housing 11. However, the condensation sensor 31 may be placed in the same position as that shown in FIG. 1, for example under the condition that a mounting member formed of the same material as that for the magnetic disc 14 is prepared and the condensation sensor 31 is installed onto the mounting member.

For example, the placement of the condensation sensor 31 on the magnetic disc 14 and direct detection of dew condensation or the like on the magnetic disc 14 are effective at detecting the risk of sticking between the magnetic disc 14 and the head slider 21. However, this will cause inconvenience that since the magnetic disc 14 is rotated, it is difficult to supply current to the condensation sensor 31 attached to the magnetic disc 14 and it is necessary to provide a balancer for compensating for out-of-balance of the rotation of the magnetic disc 14 due to the provision of the condensation sensor 31. The preparation of the mounting member formed of the same material as that for the magnetic disc 14 in the above-described manner and the placement of the condensation sensor 31 in the mounting member can avoid the aforementioned inconvenience produced when the condensation sensor 31 is attached to the magnetic disc 14. Further, this can bring about the same effect or result as when it is mounted to the magnetic disc 14.

In the aforementioned embodiment, the condensation sensor 31 is provided on the inner surface of the housing 11. However, the condensation sensor 31 may be attached to a part high in specific heat, which is provided inside the housing 11. In this case, the materials for the magnetic disc 14, housing 11, arm 23, suspension 22, etc. are changed according to use purposes or applications and hence the part highest in specific heat is also changed in material.

Since the higher the specific heat, the harder the part is to be heated and cooled, dew condensation is apt to occur in its surface. Therefore, the condensation sensor 31 is attached to the part highest in specific heat. As a result, the condensation or the like can be detected more quickly than detected at other portions and the safest design of a product is allowed.

In place of the attachment of the condensation sensor 31 to the part highest in specific heat, the condensation sensor 31 may be placed in the same position as that shown in FIG. 1 by way of example under the condition that a mounting member made of the same material as that for the part is prepared and the condensation sensor 31 is attached to the mounting member. Thus, even if the condensation sensor 31 cannot be provided due to the fact that the part highest in specific heat takes a complex shape or no space to provide the condensation sensor 31 exists in the part, the same result as when the condensation sensor 31 has been installed to the part highest in specific heat, can be obtained.

Figure 10:
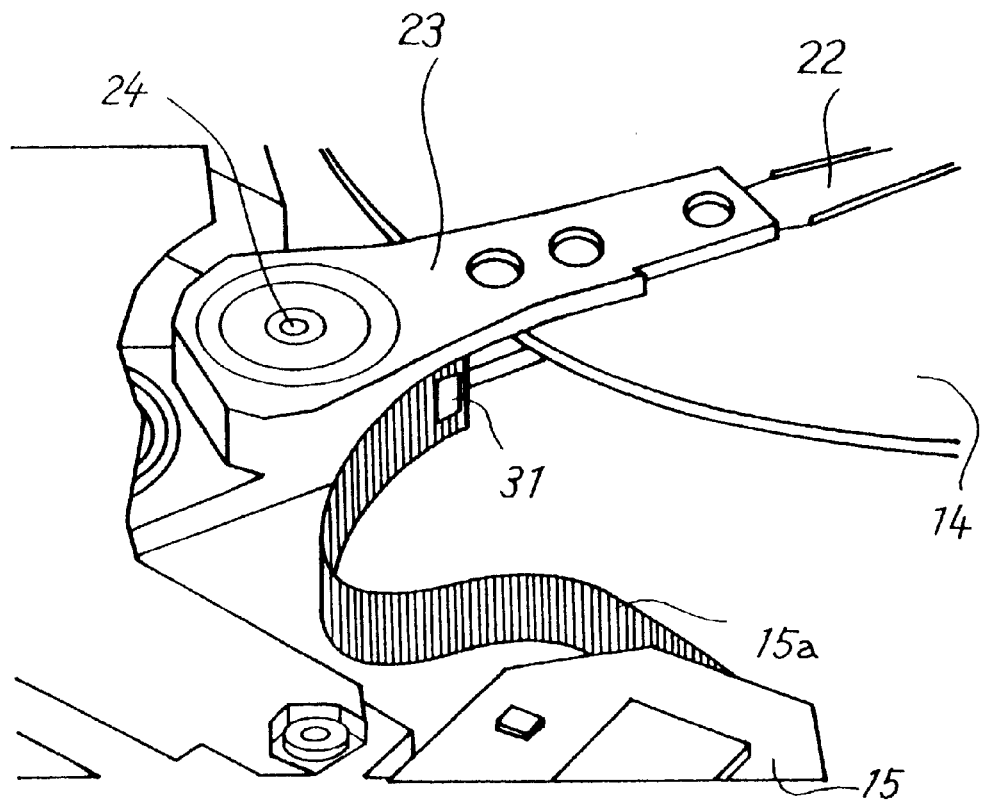
FIG. 10 is a diagram illustrating an example in which a condensation sensor is attached to a flexible printed board.

In the aforementioned embodiment, the condensation sensor 31 is provided on the inner surface of the housing 11. However, the condensation sensor 31 may be mounted in a flexible printed board 15. FIG. 10 shows an example in which the condensation sensor 31 is placed on a lead portion 15a of the flexible printed board 15.

Since the flexible printed board 15 is provided in the neighborhood of a magnetic disc 14 that causes sticking, an advantageous effect can be brought about in that dew condensation or the like corresponding to the conditions of the magnetic disc 14 can be detected. Further, the flexible printed board 15 has patterns for circuits and leads, which are formed by a semiconductor process and printing or the like. Therefore, the condensation sensor 31 can be formed integrally with the flexible printed board 15 by the semiconductor process or the like and hence its cost can be reduced.

Although the condensation sensor 31 is provided on the inner surface of the housing 11 in the aforementioned embodiment, the condensation sensor 31 may be attached to an arm 23 that constitutes an actuator 12. The arm 23 is large in surface area and hence the condensation sensor 31 can be easily attached to the arm 23. Further, an advantageous effect can be brought about in that the arm 23 is relatively large in weight and the weight of the condensation sensor 31 is hard to exert an influence on the arm 23. Since the arm 23 is placed in the position close to the flexible printed board 15, the routing of conductors or wires become easy. Further, since the arm 23 is die-cast formed of, e.g., an aluminum alloy and made up of a material relatively high in specific heat, the condensation or the like can be quickly detected.

In the aforementioned embodiment, the condensation sensor 31 is provided on the inner surface of the housing 11. However, the condensation sensor 31 may be attached to a portion which is located in the vicinity of the magnetic disc 14 and has the flow of air developed according to its rotation, as shown in FIG. 12.

For example, a sensor portion of the condensation sensor 31 is made bare and vulnerable to dust. Owing to the provision of the condensation sensor 31 in the neighborhood of the magnetic disk 14, it is possible to blow off dust adhered to the condensation sensor 31 by wind pressure developed from the rotation of the magnetic disc 14, keep the condensation sensor 31 in a state free of dirt and dust at all times, and satisfactorily detect dew condensation or the like.

Figure 13A:
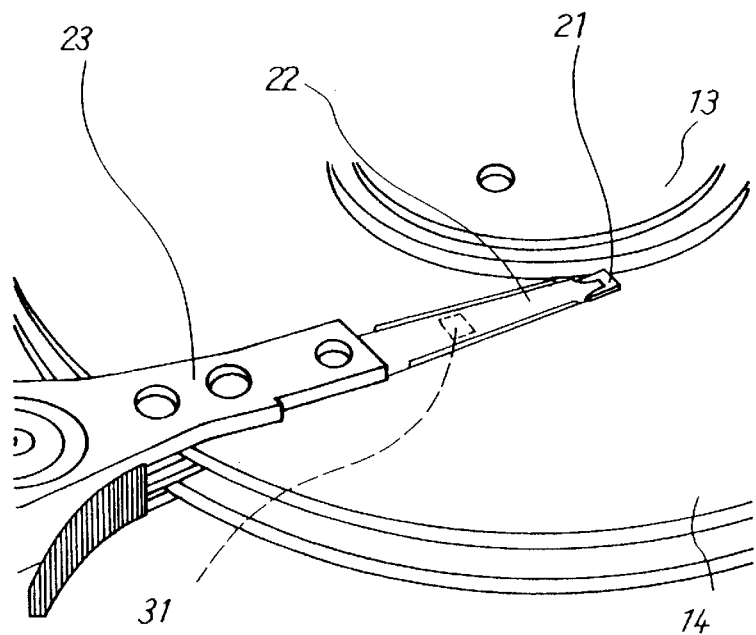
FIGS. 13A and 13B are respectively diagrams illustrating an example in which condensation sensors are mounted in a suspension of a rotatable actuator.

In the aforementioned embodiment, the condensation sensor 31 is provided on the inner surface of the housing 11. However, the condensation sensor 31 may be mounted in a suspension 22 (see FIG. 13A) which constitutes an actuator 12. For example, the condensation sensor 31 is provided on the magnetic disc 14 side of the suspension 22.

Since the suspension 22 is formed of, for example, stainless steel used as a spring member and made up of a material relatively high in specific heat, the condensation or the like can be detected quickly. Further, the suspension 22 is used to support the head slider 21 and is located at the position where it experiences wind or air pressure developed by the rotation of the magnetic disc 14. Therefore, the placement of the condensation sensor 31 in the suspension 22 makes it possible to blow off dust adhered to the condensation sensor 31 by wind pressure, keep a sensor portion of the condensation sensor 31 in a state free of dirt and dust, and satisfactorily detect dew condensation or the like.

Figure 13B:
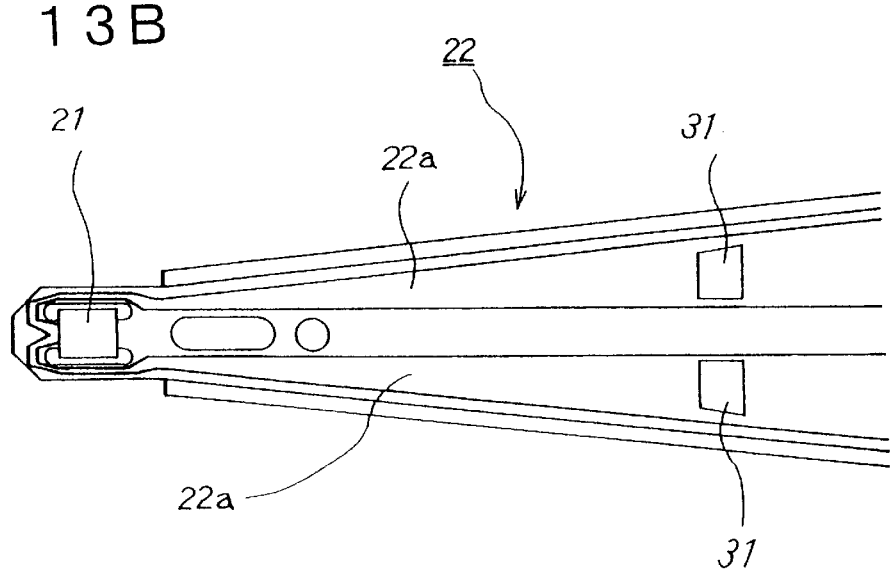

With the miniaturization of the head slider 21, such a suspension 22 as to process leads to lead forming portions 22a by a thin-film process as shown in FIG. 13B goes mainstream. However, the manufacturing cost can be reduced by simultaneously processing condensation sensors 31 in accordance with this thin-film process step.

Figure 14:
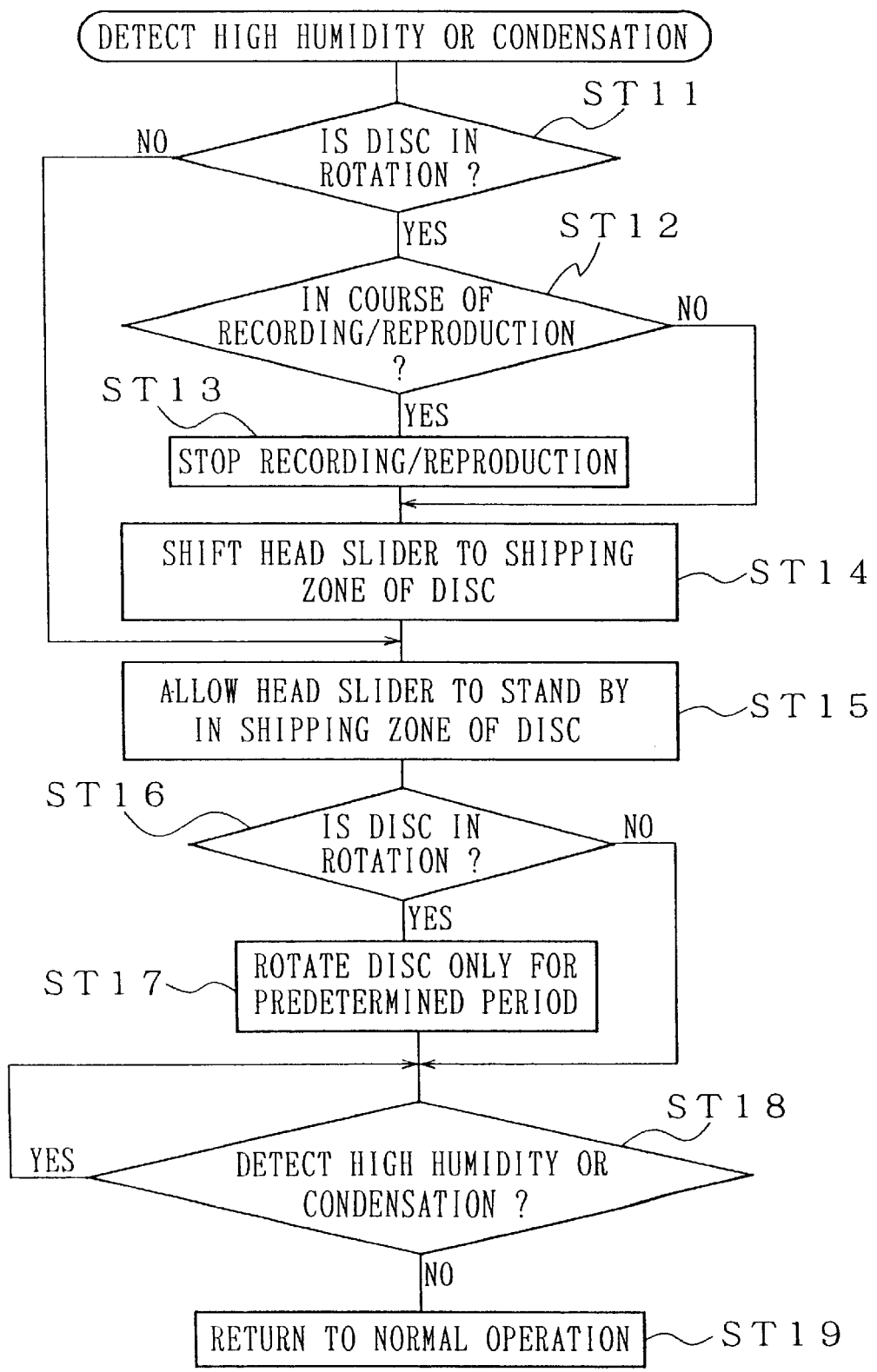
FIG. 14 is a flowchart for describing a control operation of another embodiment at the time that condensation or the like is detected.

Further, in the hard disk drive 10 shown in FIG. 6, the MPU 61 executes a control operation in line with a flowchart shown in FIG. 14, which is taken as one of an MPU employed in another embodiment at the time that the MPU 61 recognizes the detection of condensation or the like based on the output DEC detected by the condensation detector circuit 91.

In Step ST11, the MPU 61 first makes a decision as to whether a magnetic disc 14 is in rotation or being rotated. If the MPU 61 determines that the magnetic disc 14 is in rotation, then it determines in Step ST12 whether the magnetic disc 14 is in course of recording or reproduction. If the MPU 61 determines that the magnetic disc 14 is in course of recording or reproduction, then the MPU 61 stops recording or reproduction in Step ST13 and proceeds to Step ST14. On the other hand, if the MPU 61 determines that the magnetic disc 14 is not in course of recording or reproduction, then, it immediately goes to Step ST14.

In Step ST14, the MPU 61 controls a VCM driver 34 to move a head slider 21 (see FIG. 1) provided with a magnetic head 26 to a shipping zone of the magnetic disc 14 and allow the head slider 21 to stand by in the shipping zone of the magnetic disc 14 in Step ST15. When the answer is found to be NO in Step ST11, the head slider 21 is already placed within the shipping zone of the magnetic disc 14. Therefore, the MPU 61 immediately proceeds to Step ST15 where the head slider 21 is caused to stand by within the shipping zone of the magnetic disc 14 as it is.

Next, the MPU 61 determines in Step ST16 whether the magnetic disc 14 is in rotation. When it is found that the magnetic disc 14 is being rotated, the MPU 61 controls a motor driver 41 in Step ST17 so as to rotate the magnetic disc 14 in succession only for a predetermined period. Thereafter, the MPU 61 proceeds to Step ST18. On the other hand, when it is found that the magnetic disc 14 is not in rotation, the head slider 21 is placed in a state of having already been brought into contact with the shipping zone of the magnetic disc 14 and the head slider 21 might be stuck to the magnetic disc 14. Therefore, when the magnetic disc 14 is rotated, the magnetic disc 14 stops rotating and the head slider 21 or suspension 22 might give rise to an accident such as unsticking of the head slider 21 or suspension 22 from an arm 23 at worst. When it is found in Step ST16 that the magnetic disc 14 is not in rotation, the MPU 61 immediately goes to Step ST18 without rotating the magnetic disc 14.

The MPU 61 determines in Step ST18 whether the dew condensation or the like is detected by the condensation detector circuit 91. After no condensation or the like has been detected, the MPU 61 goes to Step ST19 where it is returned to its ordinary operation, e.g., a state prior to the detection of the condensation or the like.

In another embodiment as has been described above, when the condensation or the like is detected in the state in which the magnetic disc 14 is in rotation, the magnetic disc 14 is further rotated only for the predetermined period. Therefore, the adsorption of moisture by the magnetic disc 14 is less reduced and the adhesion of moisture to the magnetic head 26 is reduced, whereby their corrosion produced due to the adhesion of moisture and their breakage or the like produced due to a short circuit of a circuit system can be avoided. Since the adsorption of moisture by the magnetic disc 14 is less reduced, inconvenience that moisture enters between a lubricant applied to the magnetic disc 14 and the surface of the magnetic disc 14, can be avoided. Further, since the spindle motor 13 is rotated, the moisture is hard to enter into the spindle motor 13 and the spindle motor 13 can be prevented from being degraded in characteristic.

When the writing or reading is being done upon detection of the dew condensation or the like, the writing or reading is immediately stopped. Therefore, when, for example, the recording is being done, the supply of the recording current to the recording magnetic head 26A is stopped. Even if the moisture adheres to the recording magnetic head 26A, the breakage or the like due to the short circuit of the circuit system can be avoided.

When the condensation or the like is detected in a state in which the magnetic disc 14 is at rest, the magnetic disc 14 is brought to a stopped state as it is. It is therefore possible to avoid the occurrence of an accident such as the head slider 21 or suspension 22 being separated or unstuck from the arm 23 by forcibly rotating the magnetic disc 14 when the head slider 21 sticks to the magnetic disc 14.

In another embodiment described above, when the condensation or the like is detected in the state in which the magnetic disc 14 is being rotated, the magnetic disc 14 is further rotated only for the predetermined period (see Step ST17 in FIG. 14). However, the magnetic disc 14 may be rotated continuously until no condensation or the like is detected. It is also considered that the rotation of the magnetic disc 14 is stopped over the period from the detection of the condensation or the like to its non-detection.

Figure 15:
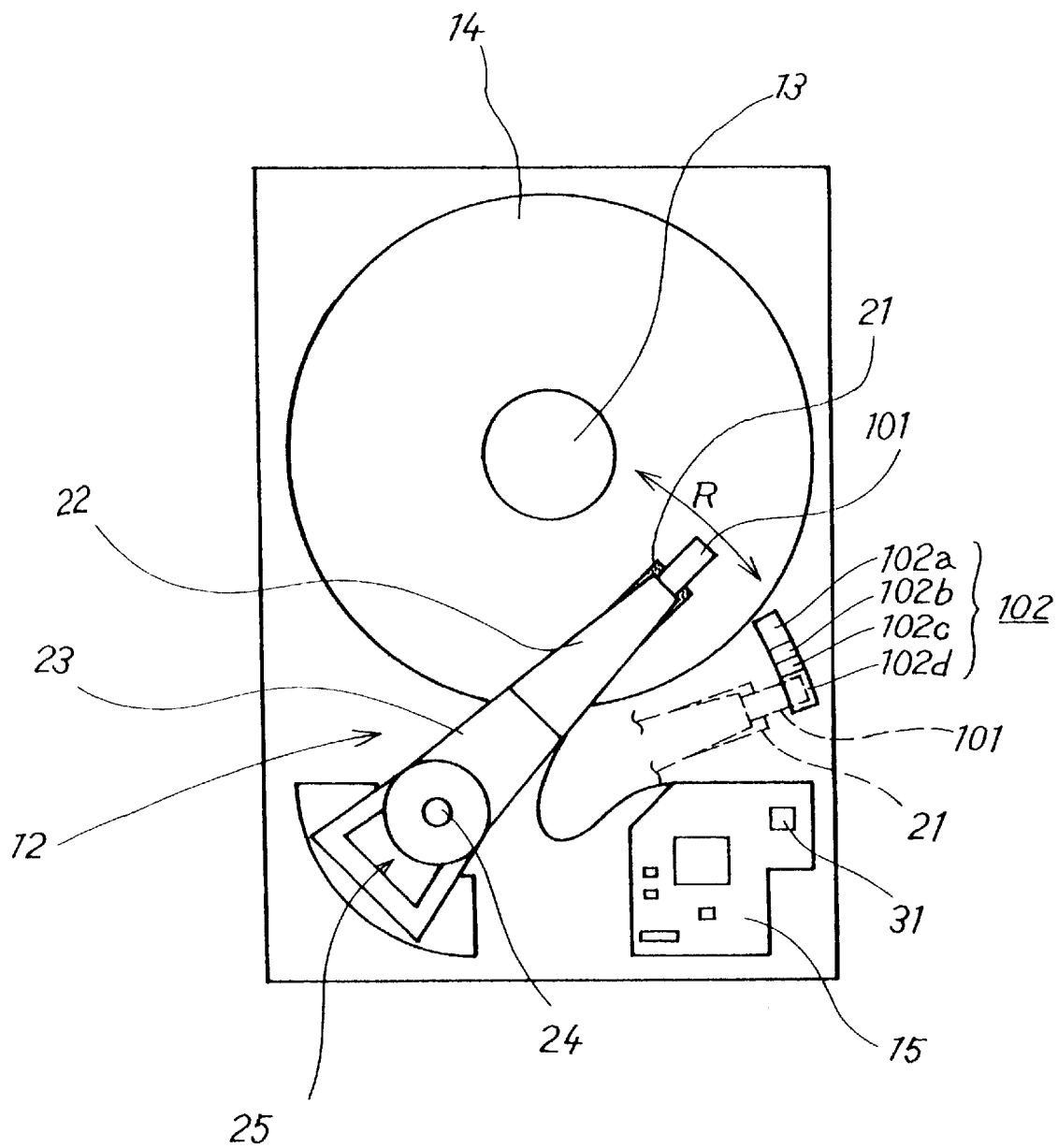
FIG. 15 is a diagram showing a configuration of a hard disk drive according to a further embodiment in simple linear form.

A further embodiment of the present invention will next be described. FIG. 15 shows a configuration of a hard disk drive (HDD) 100 used as the further embodiment on a simple linear basis. In FIG. 15, parts corresponding to those shown in FIG. 1 are identified by the same reference numerals and their detailed description will be omitted.

The hard disk drive 100 adopts a floating or levitation type head device of an NCSS system. Namely, a bar-shaped member 101 semicircular in cross section is attached to a support-side end of a head slider 21 of a suspension 22 so that a circular arc surface thereof takes a lower surface. A lamp 102 for withdrawing the head slider 21 is located in the neighborhood of the outer periphery of a magnetic disc 14 and placed on a housing (chassis) 11. A region inclined in a slide form along the locus of the bar-shaped member 101 when an arm 23 turns, exists within the lamp 102. Namely, the lamp 102 is constructed so as to have an up slope 102a, a flat portion 102b, a down slope 102c, and a flat portion 102d as seen from the magnetic disc 14 side.

When the power is in an off state in the above-described construction, the arm 23 is driven so that the bar-shaped member 101 is brought to a state of being placed on the flat portion 102d of the lamp 102 as indicated by broken lines in the drawing. In this case, the head slider 21 is withdrawn or separated from the surface of the magnetic disc 14 and held in the air in a state of being withdrawn from above the surface of the magnetic disc 14. With the power-on, the magnetic disc 14 starts to rotate and thereby the arm 23 is driven so that the head slider 21 is placed on the surface of the magnetic disc 14. In this condition, the magnetic disc 14 performs recording and reproducing operations or stands ready for their preparations.

Even in the hard disk drive 100, a condensation sensor 31 is placed on a flexible printed board 25. Further, the hard disk drive 100 is identical in circuit configuration to the hard disk drive 10 (see FIG. 6). The hard disk drive 100 is activated in a manner similar to the hard disk drive 10 except for the operation for detecting the condensation or the like.

Figure 16:
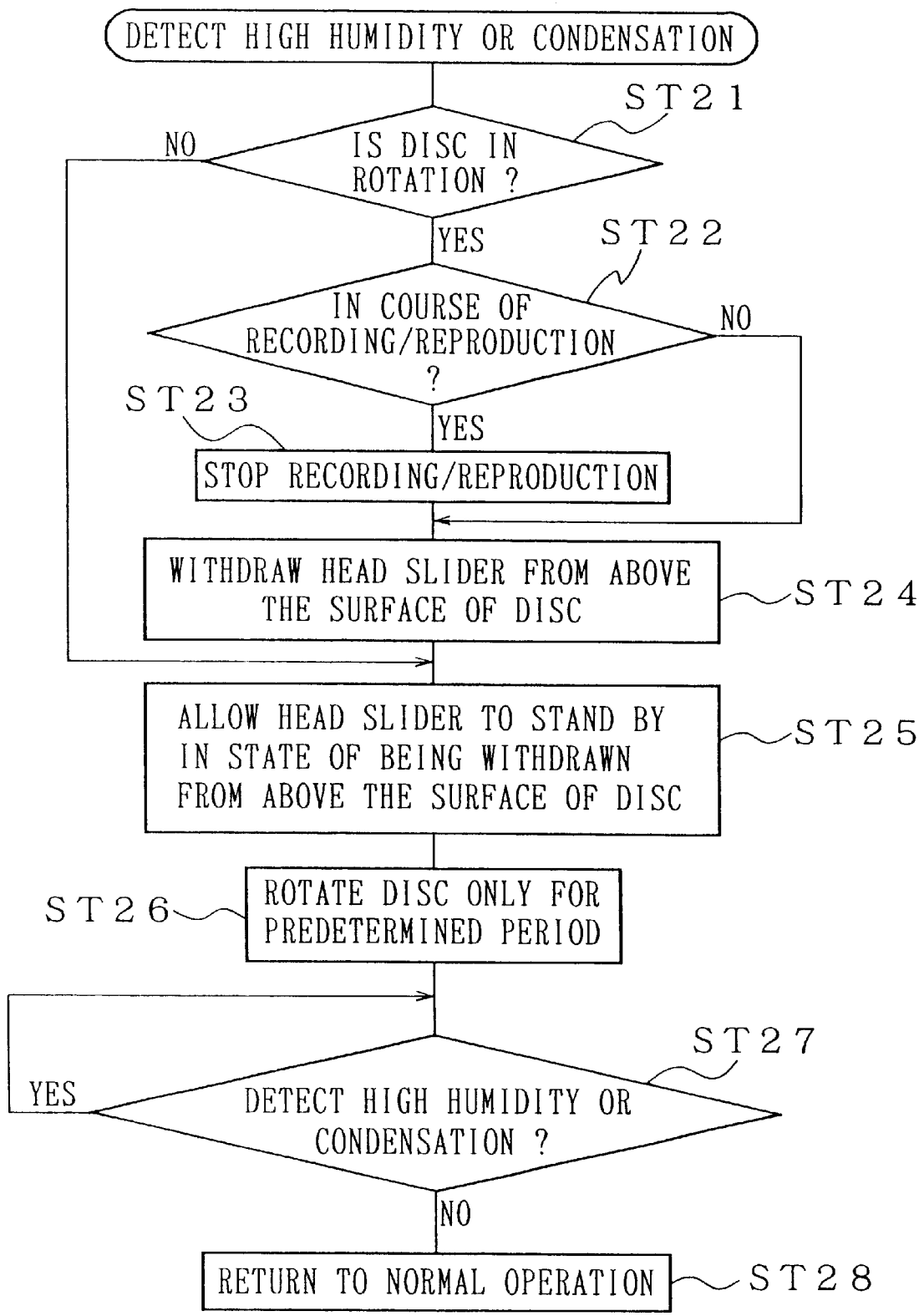
FIG. 16 is a flowchart for describing a control operation of the further embodiment at the time that condensation or the like is detected.

When an MPU 61 in the hard disk drive 100 shown in FIG. 15 recognizes the detection of dew condensation or the like from an output DEC detected by a condensation detector circuit 91, it executes a control operation in line with a flowchart shown in FIG. 16.

In Step ST21, the MPU 61 firstly makes a decision as to whether the magnetic disc 14 is in rotation or being rotated. If the MPU 61 determines that the magnetic disc 14 is in rotation, then it determines in Step ST22 whether the magnetic disc 14 is performing recording or reproduction. If the MPU 61 determines that the magnetic disc 14 is in course of recording or reproduction, then the MPU 61 stops recording or reproduction in Step ST23 and proceeds to Step ST24. On the other hand, if the MPU 61 determines that the magnetic disc 14 does not perform recording or reproduction, then, it immediately goes to Step ST24.

In Step ST24, the MPU 61 controls a VCM driver 34 to withdraw the head slider 21 (see FIG. 9) provided with a magnetic head 26 from above the surface of the magnetic disc 14. Namely, as indicated by the broken lines in FIG. 9, the bar-shaped member 101 is placed in the state of being placed on the flat portion 102d of the lamp 102 and the head slider 21 is separated from the surface of the magnetic disc 14 so as to be held in the air. In Step ST25, the MPU 61 allows the head slider 21 to stand by in its withdrawn state. Since the head slider 21 is already placed in the withdrawn state when it is found in Step ST21 that the magnetic disc 14 is not in rotation, the MPU 61 immediately proceeds to Step ST25 where the head slider 21 is allowed to standby in the withdrawn state.

Next, the MPU 61 rotates the magnetic disc 14 only for a predetermined period in Step ST26. Thereafter, the MPU 61 goes to Step ST27. In Step ST27, the MPU 61 makes a decision as to whether the condensation or the like is detected by the condensation detector circuit 91. After no condensation or the like has been detected, the MPU 61 proceeds to Step ST28 where it is reset to its normal operation, e.g., a state prior to the detection of the condensation or the like.

In the further embodiment as has been described above, when the condensation or the like is detected, the head slider is set so as to be withdrawn from above the surface of the magnetic disc 14. It is therefore possible to prevent the adhesion of moisture to the magnetic head 26 from the surface of the magnetic disc 14 and avoid corrosion of the magnetic head 26 due to the adhesion of the moisture and its breakage or the like due to a short circuit of a circuit system.

When the condensation or the like is detected, the magnetic disc 14 is rotated only for the predetermined period. Therefore, the adsorption of the moisture by the magnetic disc 14 is less provided and inconvenience that moisture enters between a lubricant applied to the magnetic disc 14 and the surface of the magnetic disc 14, can be avoided. Further, since a spindle motor 13 is rotated, the moisture is hard to enter into the spindle motor 13 and hence the spindle motor 13 can be prevented from being degraded in characteristic.

When the writing or reading is being done upon detection of the dew condensation or the like, the writing or reading is immediately stopped. Therefore, when, for example, the recording is being done, the supply of a recording current to a recording magnetic head 26A is stopped. Even if the moisture adheres to the recording magnetic head 26A, the breakage or the like due to the short circuit of the circuit system can be avoided.

In the embodiment described above, when the condensation or the like is detected, the magnetic disc 14 is rotated only for the predetermined period (see Step ST26 in FIG. 16). However, the magnetic disc 14 may be rotated continuously until no condensation or the like is detected. It is also considered that the rotation of the magnetic disc 14 is stopped over the period from the detection of the condensation or the like to its non-detection.

Incidentally, the aforementioned embodiments show the hard disk drives to which the present invention is applied. It is however needless to say that the present invention can be similarly applied even to other disk drives or disk driving devices in which sticking between disk-shaped recording mediums and heads under the environment of dew condensation or the like, ill effects due to the adhesion of moisture to the heads from the disk-shaped recording mediums, etc. are considered.

According to the present invention, when the high humidity or dew condensation is detected, the position of the head slider and the operation of the device body, such as the rotation of the disk-shaped recording medium are controlled. Thus, accidents such as head breakage produced due to moisture adsorbed by the disk-shaped recording medium due to the high humidity or condensation, etc. can be effectively prevented from occurring.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A recording medium driving device for recording a signal on a recording medium or reproducing the signal from said recording medium, comprising:

a condensation sensor;

means for controlling the operation of a device body on the output of said condensation sensor;

a part which slides over said recording medium; and a mounting member inside a housing, said mounting member spaced apart and separate from the part which slides over said recording medium;

wherein said condensation sensor is attached to the mounting member, and wherein said mounting member is formed of the same material as that for the part which slides over said recording medium;

wherein said recording medium is a disk-shaped recording medium, said device further comprises a head slider provided with a head for recording a signal on said disk-shaped recording medium or reproducing the signal from said disk-shaped recording medium, and said condensation sensor is attached to said head slider or a mounting member comprised of the same material as that for said head slider.

* * * * *